United States Patent [19]

Marshall

[11] Patent Number: 5,277,941
[45] Date of Patent: Jan. 11, 1994

[54] SYSTEM TO INSULATE AND RETAIN COLD TEMPERATURE

[76] Inventor: David A. Marshall, 1038 Prospect St., Chicopee, Mass. 01020

[21] Appl. No.: 898,728

[22] Filed: Jun. 15, 1992

[51] Int. Cl.$^5$ .......................... B32B 1/02; B32B 1/06; B32B 1/08
[52] U.S. Cl. ..................................... 428/12; 428/188; 428/319.1; 428/319.3; 428/319.7
[58] Field of Search ...................... 428/12, 188, 319.1, 428/319.3, 319.7

[56] References Cited

U.S. PATENT DOCUMENTS

| | | | |
|---|---|---|---|
| 3,396,923 | 8/1968 | Windecker | 428/319.3 |
| 3,675,377 | 7/1972 | Suter | 428/12 |
| 4,208,469 | 6/1980 | Dial | 428/12 |
| 4,360,984 | 11/1982 | Ruttenberg | 428/391.1 |

*Primary Examiner*—William J. Van Balen

[57] ABSTRACT

A unique system to insulate and retain the cold temperature of products, liquids, or materials of any type or nature. In the preferred embodiment, the system comprises a series of layers of material as follows: (1) a hard, durable plastic layer of polyvinyl chloride or similar material; (2) a layer of retardant aluminum; (3) a layer of styrofoam; (4) a layer of neoprene; (5) a cavity which is filled with dry ice through an input valve at the top of the system and which is purged through an escape or purge valve at the bottom of the system; the layers completely surround and envelope the cavity such that one closed system is created.

The system could be made in any of many shapes and sizes to accommodate various industries, for example, the system constructed in the outer shape of a beer keg could constitute a jacket, which would be removable with hinges and buckles to keep kegs cold for up to 96 hours without refrigeration or ice. The system could be constructed in the appropriate shape and size for use in the emergency medical industry to transport vital organs or items which must be kept cold without the use of refrigeration. The system could be used to keep food products frozen during transportation. The concept would eliminate, in many applications, the need for refrigeration which would decrease consumption of electricity and which would have positive environmental effects by eliminating the use of freon and other chemicals consumed and released in the refrigeration process.

1 Claim, 1 Drawing Sheet

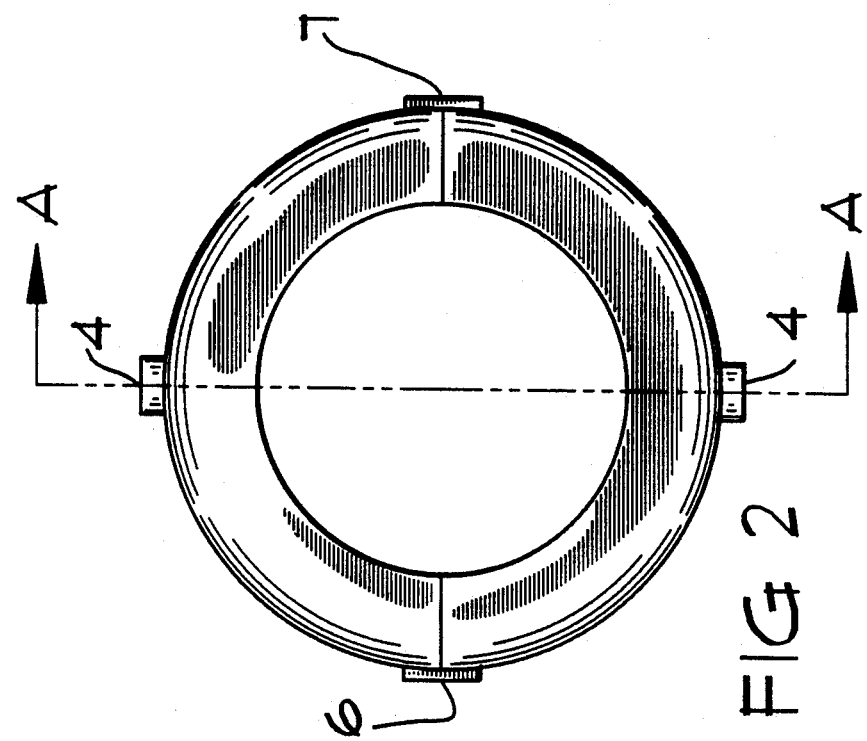
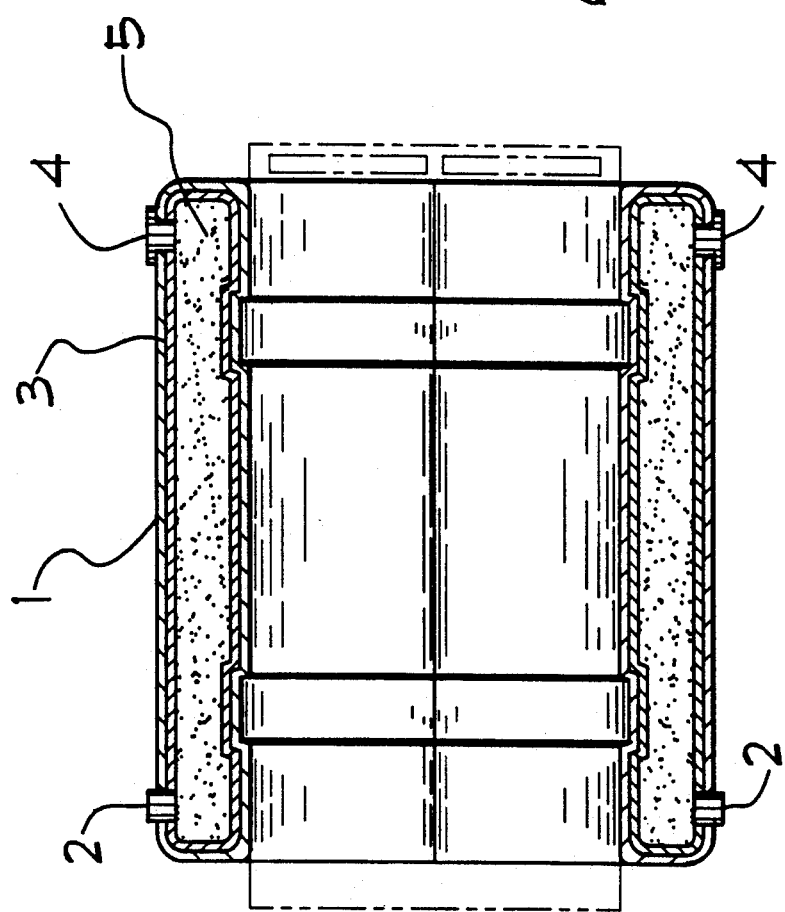
FIG 2
FIG 1
SECTION A-A

SYSTEM TO INSULATE AND RETAIN COLD TEMPERATURE

BACKGROUND OF THE INVENTION

This invention relates to a system to insulate and retain cold temperature of various products, goods or materials without the use of refrigeration concepts, an energy source or ice cubes or ice slabs. The object of the invention is to produce a system to retain cold temperatures which is economical to manufacture, economical to use, lightweight, accessible and efficient. These and further objects of the invention will be apparent from the following description of the preferred embodiment.

SUMMARY OF THE INVENTION

The system to insulate and retain cold temperature includes four layers of materials of equal size constructed adjacent to and in direct communication with each other in a particular order which together form and define a closed cavity. An input valve is positioned and constructed at the top end of the system through which dry ice in liquid form is introduced into the cavity. Upon stabilization the liquid dry ice becomes solid. The system is constructed in a shape and size to accommodate specifically the product to which it will be applied. The system will retain cold temperature for up to 4 days or 96 hours at the expiration of which time the dry ice will convert from a solid to a gas. The gaseous fumes will be released from the system via a purge valve similar in structure to the input valve but located at the base or bottom of the system.

BRIEF DESCRIPTION OF THE DRAWING

The invention is further described in connection with the accompanying drawing, in which the various layers of the system are shown in a cross-section format. The cavity which:

FIG. 1 is a cross-sectional view taken along the lines A—A in FIG. 2.

FIG. 2 is a cross sectional view of an article insulated with a system in accordance with the invention.

DESCRIPTION OF THE PREFERRED EMBODIMENT

FIG. 1 of the drawings is a cross-sectional view of a circular article such as a beer keg insulated with a system in accordance with the invention wherein 1 represents a hard, durable plastic layer such as polyvinyl chloride with a layer of retardant aluminum, 3 represents a layer of STYROFOAM with a layer of neoprene, 5 is a cavity filled with dry ice and 2 and 4 represent input and purge valves. In FIG. 2, 6 and 7 represent hinges or buckles designed to lock the system in place.

Having defined the invention and its many rewarding features, what is claimed is:

1. A system consisting of a hard plastic outer layer applied in direct and total contact with a layer of retardant aluminum applied in direct and total contact with a layer of styrofoam of exactly the same size and shape as said layer of hard plastic and said layer of aluminum which layer of styrofoam is applied in direct and total contact with a layer of neoprene of exactly the same size and shape as said layer of styrofoam), said layers of plastic, aluminum, styrofoam and neoprene being arranged so as to form a cavity of a width equivalent to or greater than the said layers of plastic, aluminum, styrofoam and neoprene, said cavity being completely enveloped by said layers of plastic, aluminum, styrofoam and neoprene, said layers of plastic, aluminum, styrofoam and neoprene having a top end and a lower end, said top end having a valve through which dry ice will be introduced into said cavity, said valve having a secure, air-tight closure, said lower end having a purge valve through which the dry ice in its gaseous form shall be allowed to escape from said cavity, said valve having a secure, air-tight closure.

* * * * *